T. J. SLOAN.
Assorting Screws.
No. 8,082.
Patented May 6, 1851.
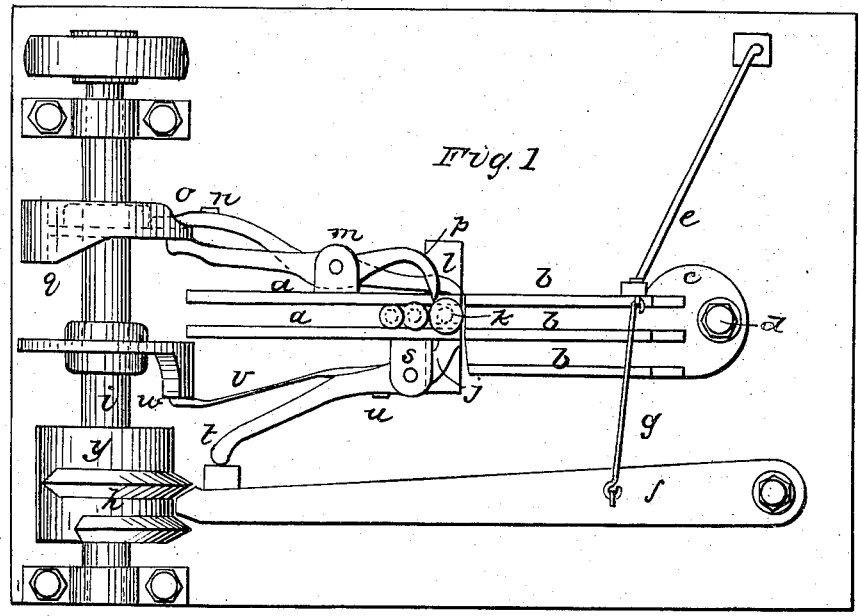
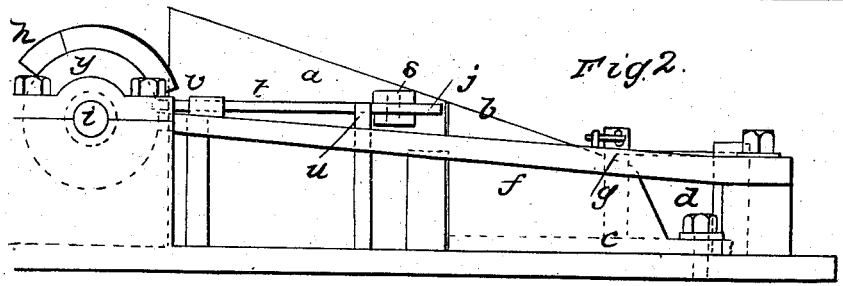
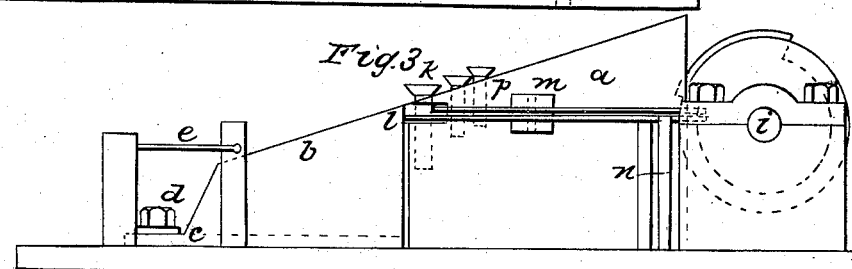
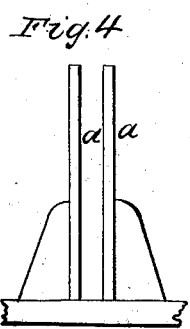
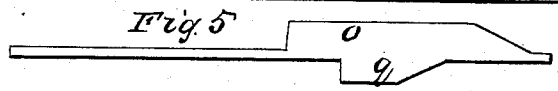
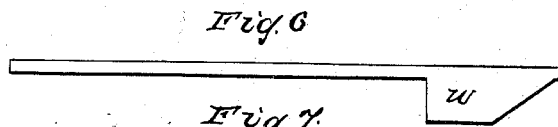
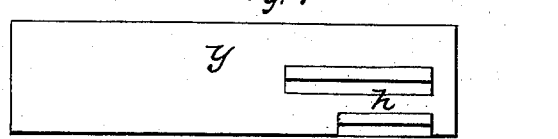

UNITED STATES PATENT OFFICE.

THOS. J. SLOAN, OF NEW YORK, N. Y.

MACHINE FOR ASSORTING SCREW-BLANKS, &c.

Specification of Letters Patent No. 8,082, dated May 6, 1851.

*To all whom it may concern:*

Be it known, that I, THOMAS J. SLOAN, of the city, county, and State of New York, have invented a new and useful Machine for Assorting Screws and other Articles According to Their Sizes; and that the following is a full, clear, and exact description thereof, reference being had to the accompanying drawings, making part of this specification, in which—

Figure 1 is a plan; Fig. 2 a right hand side, and Fig. 3 a left hand side elevation; Fig. 4, an end elevation of the ways; and Figs. 5, 6, and 7, the three cams developed.

The same letters indicate like parts in all the figures.

The object of my invention is to assort screws, and screw blanks according to their diameters or lengths so as to deliver each size separately; but it will be evident on examination that the said invention is applicable to the assorting of other articles such as rivets, pins, balls, shot, &c.

The screws or other articles to be assorted pass from a hopper on to inclined ways between which their shanks hang with the heads on the upper edges thereof, and the ways being inclined they run down by gravity toward the delivery end where these ways are combined with a series of shifting ways, corresponding in number with the number of sizes of screws, or the series may consist of two where it is only required to separate one size from the mass. When any one screw reaches the lower end of the permanent ways, it is first arrested by a movable stop combined with the ways and before it is delivered by the withdrawal of this first stop, it is separated from the others by a second stop combined with the ways and the first stop; and for the purpose of presenting that one of the series of shifting ways which is to receive the screw to be delivered there is combined with the shifting ways a detector which is brought against the shank of the blank the diameter of which determines the extent of the motion or position of the ways.

In the accompanying drawings (*a a*) represent two inclined ways placed so far apart as to permit the screws or screw blanks to hang by their heads and with the shanks hanging loosely between them. The screws &c., are supplied to the ways from a hopper or in any other appropriate manner, and the inclination must be such as to permit them to descend by gravity. At the lower ends of these ways there is a series of shifting ways (*b b*) attached to a plate (*c*) jointed to the frame at (*d*) so as to vibrate thereon. The drawing represents this series as consisting of only two which is deemed sufficient to give a clear representation of the practical application of the principle of my invention as the number may be increased at pleasure. By the vibration of the plate (*c*) it will be seen that the inner ends of either of the series of ways (*b b*) can be made to coincide with, and be in continuation of the main ways (*a a*). These movable ways are drawn in one direction by the tension of a spring (*e*) and in the reverse direction by a lever (*f*) connected therewith by a rod (*g*), the said lever being at the required time acted upon by a series of cams or grooves (*h*) on the cam shaft (*i*) and by the detector (*j*) in manner to be hereafter described.

When a screw reaches the lower end of the main ways as at (*k*) it is stopped by the pointed end of a stop lever (*l*) which turns on a fulcrum at (*m*) the other end being acted upon by a spring (*n*) to force in the stop and by a cam (*o*) on the cam shaft to draw it out when the screw is to be delivered. But before the stop (*l*) is drawn out the point of another stop lever (*p*) (made and operated in like manner by another cam (*q*)) is inserted between the screw to be delivered and the one next above it. In this way the screws are in succession brought to the position (*k*) and when one is delivered, there is no danger of any more than that one passing out.

The relative form and position of the two cams for operating the stop levers is fully represented in Fig. 5 which represents the two cams as developed. Before the stop lever (*l*) is drawn out to deliver a screw a detector (*j*) is forced up against the shank of the screw at (*k*). This detector passes through a mortise in one of the main ways (*a*) and turns on a fulcrum at (*s*) the other end (*t*) of the lever of the detector being made to act on the lever (*f*) which operates the shifting ways (*b b*). The detector is drawn out by the tension of a spring (*u*) bearing against its lever, and to the inside of the lever is attached a spring arm (*v*) the end of which bears against the face of a cam (*w*) on the cam shaft by which it is forced outward to force the detector against the shank of the screw, and at the same time forcing the lever of the detector against the lever (*f*) of the shifting ways so as to carry the end of this lever to the distance required to determine which of the series of ways (*b b*) shall be made to coincide with the main ways preparatory to the delivery of the screw.

As the arm (*v*) is a spring it will be seen that the cam (*w*) is sufficient to give the greatest required range of motion to the detector to carry it as far as the size of the screw shank will permit the spring arm yielding when the full amount of motion is not required. But as the screw cannot be delivered while the detector is held against it and the lever (*f*) of the shifting ways is operated by the detector it becomes necessary to hold the ways in place while the detector is withdrawn. This is done by segment cams or grooves (*x*) in a drum (*y*) on the cam shaft.

As the drawings represent the machine as adapted to the assorting of two sizes or one size from the mass, there is but one such segment groove, but it will be remembered that there must be one such groove added for every additional set of ways in the series. The position of these segment grooves and their length in the direction of the periphery, as developed in Fig. 7 must be such that the moment the lever (*f*) of the shifting ways has been carried to the required position by the detector lever to determine the position of the shifting ways the end of this lever is caught in the segment groove (*h*) and there held until the screw has been delivered. The lever is then liberated and the ways shifted back by the tension of the spring before described.

As the heads of screws are of much greater diameter than the shanks the same set of ways will answer for several sizes, the space between the ways being made sufficiently large for the largest size shanks to pass freely between them and to hold up the heads of the smallest.

When the machine is to be applied to the assorting of screws according to their length there must be one detector for each length to be separated, and placed one below the other so as to pass under the lower end of the short shanks and strike against the long ones according to their position. In this way the position of the shifting ways is determined to deliver the long and the short screws in different places.

It will be obvious from the foregoing that rivets or pins can be assorted in the same manner as screws according to the difference in the diameter or length. And it will also be evident that by varying the form of the ways by substituting a channel that balls or shot can be separated as well as screws; and in short that other articles not necessary to enumerate which will run down on ways or in a channel can be separated according to their different sizes.

I do not wish to limit myself to the special construction and arrangement herein specified as the principle of my invention is susceptible of various modifications, as for instance the stops and the detector may be made to slide instead of being on vibrating levers, and instead of a series of shifting ways one set of shifting ways alone may be used when the machine is only to be used for separating from each other two sizes, or selecting one size from several other sizes, in which cases some of the articles will be delivered directly from the end of the main ways; but I have given a particular description of the mode of construction, which I have essayed with success and deem the best.

What I claim as my invention and desire to secure by Letters Patent, is—

1. The combination of the series of shifting ways, with the main or stationary ways for the purpose and in the manner substantially as specified.

2. And I also claim the detector substantially as specified in combination with the stationary and the shifting ways substantially in the manner and for the purpose specified.

THOS. J. SLOAN.

Witnesses:
CAUSTEN BOWNER,
CHAS. BAMBURGH.